United States Patent
Mason

[15] 3,672,052
[45] June 27, 1972

[54] INFANT FEEDING DEVICE

[72] Inventor: Allen C. Mason, P.O. Box 927, Golden, British Columbia, Canada

[22] Filed: Dec. 7, 1970

[21] Appl. No.: 95,745

[52] U.S. Cl. ............................................................. 30/130
[51] Int. Cl. ...................................................... A47j 43/28
[58] Field of Search ........................... 30/123, 128, 130, 141; 222/320; 141/27

[56] References Cited

UNITED STATES PATENTS

| | | | |
|---|---|---|---|
| 869,879 | 11/1907 | Cameron | 30/130 X |
| 1,526,753 | 2/1925 | Levene | 30/130 X |
| 1,917,137 | 7/1933 | Marchio | 30/130 X |
| 2,550,210 | 4/1951 | Vance | 30/128 X |
| 2,698,996 | 1/1955 | Hickerson | 30/128 X |

Primary Examiner—Theron E. Condon
Assistant Examiner—J. C. Peters
Attorney—Fetherstonhaugh & Co.

[57] ABSTRACT

A device to simplify feeding infants their first solid foods which consists of a tube having an open end adapted to be inserted into the infant's mouth and a plunger movable within the tube to draw food into the tube by suction as the plunger is moved away from the open end and to expel that food into the child's mouth during movement of the plunger towards the open end. The tube has an external annular flange to prevent it from being inserted too far into the child's mouth and a stop to prevent the plunger from being pushed past the open end of the tube.

3 Claims, 4 Drawing Figures

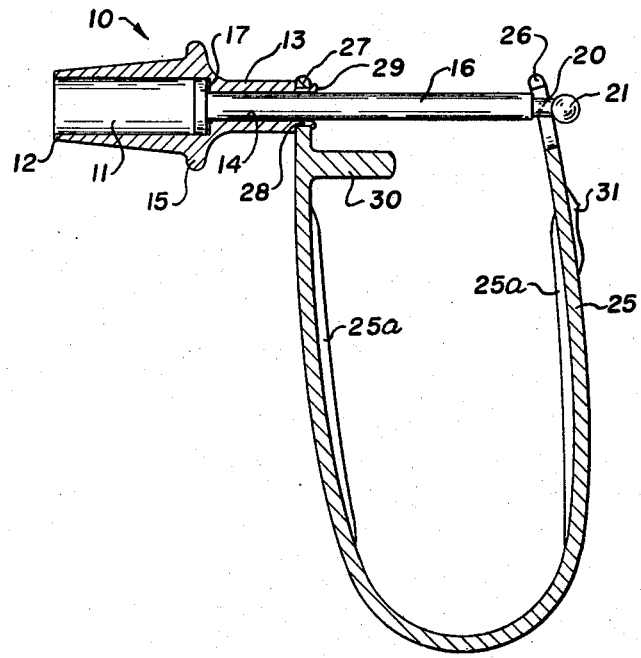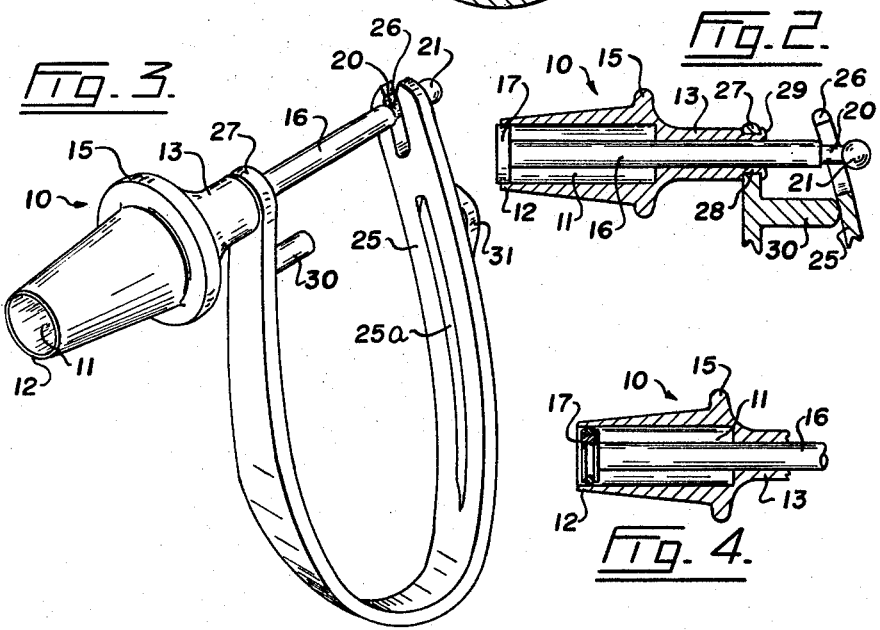

INFANT FEEDING DEVICE

This invention is concerned with a device for feeding such foods as pablum and purees to infants. These foods are commonly referred to as solids to distinguish between them and liquid foods such as natural and artificial milk. This common usage "solid foods" is used throughout this specification even though perhaps more accurately the foods which the expression signifies could be described as viscous liquids or pastes.

Feeding infants their first solid foods is a notoriously messy and difficult operation. The child presently is spoon fed but offers little co-operation or, worse, active resistance. The device according to this invention is one which is intended to simplify the weaning operation.

According to one aspect of this invention there is provided a device which has a tube having an open end and a plunger reciprocable in the piston to draw food into the tube as it is moved away from the open end and when that open end is dipped into the food, and to expel food from the tube into the child's mouth as it is moved towards the open end. Preferably the tube has an external annular flange which limits the extent to which the device may be inserted into the infant's mouth.

Conveniently there is a stop associated with the plunger to prevent this from being moved outwardly beyond the open end of the tube.

The plunger is conveniently biased towards its inward position most remote from the open end of the tube and the biasing may be affected by a resilient handle which is secured at one end to the tube and at the other end to the plunger.

An embodiment of this invention is illustrated, schematically, in the accompanying drawings in which, FIG. 1 is a cross-section through the device, FIG. 2 is a cross-section similar to FIG. 1 and a part of the unit showing it in a different position, FIG. 3 is a perspective view of the device of FIG. 1, and, FIG. 4 is a partial cross-section of an alternative form of the device.

The device comprises a body 10 within which is formed a tube 11 which has an open end 12. The outer surface of the body the cylinder tapers towards the open end.

The body has a reduced diameter portion 13 which has a narrow guide passageway 14 formed therethrough which is coaxial with the tube 11. The tube portion and smaller diameter portion of the body are separated by an external annular flange 15.

Guided within the passageway 14 of the body 10 is the stem 16 of a plunger, the head of which is indicated at 17 and which is located within the tube 11.

The end of the stem remote from the head 17 has a neck 20 which separates the major portion of the stem from a ball 21.

A handle 25 is releasably located upon the neck 20 by its bifurcated end 26 which is snap fitted over the neck and is prevented from being inadvertently disengaged from the neck by means of the ball 21.

The handle 25 is of resilient material and at its end remote from its connection to the neck 20 of the stem is secured to the body 10 by means of an eye 27 which is fitted over a neck 28 of the body, the outer marginal edges of the neck being over the eye as at 29 to prevent the handle from being disengaged from the body.

The handle has a projecting stop 30 with which a corresponding region of the handle adjacent to the bifurcated end 26 co-operates to limit the extent to which the two ends of the handles may be brought together and thus to limit the extent to which the plunger can be moved towards the open end of the tube.

The handle also has a thumb grip 31 to assist in this operation to make the handle durable and strong there are formed therealong ribs 25a.

To feed an infant with the device of the drawings the open end of the tube is placed into the food with the plunger in the position shown in FIG. 2. The plunger is held in this position by the hand bringing the two ends of the handle together.

The ends of the handle may then be allowed to move apart under the influence of the resilience of the handle and under the control of the hand to cause the solid food to be drawn into the tube ahead of the plunger.

The open end of the plunger is then inserted into the child's mouth and food is ejected from the tube by moving the ends of the handle together and thus causing the plunger to travel towards the open end of the tube pushing the food ahead of it. The stop 30 prevents the plunger from being moved beyond the open end of the tube so that a child's tongue or lips could not be caught between the edges of the plunger and the tube. Additionally the annular flange 15 prevents the tube from being inserted too deeply into the child's mouth.

While the embodiment illustrated in FIGS. 1 to 3 the plunger has a solid head it is to be appreciated that as an alternative it may have an O-ring such as that illustrated in FIG. 4 to provide an effective seal between the plunger head and the walls of the tube. Conveniently there may be a small aperture at the edge of the plunger head to relieve the pressure to either side of the tube so that the operation of drawing food into the tube and expelling it is easy. This also facilitates removal of the O-ring for cleaning and sterilizing purposes.

It is appreciated that the device herein described is one which will greatly facilitate the presently tedious and messy operation of feeding infants their first solid food. It is also one which is easily disassembled for sterilizing.

I claim:

1. For feeding solid foods to infants, a device comprising a generally tubular body having two coaxial passages therethrough one of which is of larger diameter than the other, a plunger having a head and a stem, the head being reciprocable within the larger diameter passage and being of generally similar cross-section to that passage, the stem being guided within the narrower passage of the body, a handle of generally U-shape having one end secured to said body and having its other end secured to the stem of the plunger, movement of the ends of the handle towards and away from each other causing the plunger head to be reciprocated within the larger passage of the body, said stem having a reduced diameter neck near an end thereof remote from the plunger head, and said handle having a bifurcated end releasably secured to the reduced diameter neck of the stem.

2. A device as claimed in claim 1, in which one end of the handle has a stop coacting with the other end of the handle to limit the extent the ends of the handle may be brought together and thus to limit the extent to which the plunger head may be moved away from the narrower passage.

3. A device as claimed in claim 1, in which said handle is formed of resilient material shaped to bias the plunger head towards the narrower passage.

* * * * *